US010638754B2

(12) United States Patent
Zhang et al.

(10) Patent No.: US 10,638,754 B2
(45) Date of Patent: May 5, 2020

(54) METHODS OF ATTRACTING *DROSOPHILA SUZUKII* USING ACETOIN BLEND

(71) Applicant: The United States of America, as Represented by the Secretary of Agriculture, Washington, DC (US)

(72) Inventors: Aijun Zhang, Laurel, MD (US); Yan Feng, Frederick, MD (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 16/123,496

(22) Filed: Sep. 6, 2018

(65) Prior Publication Data
US 2019/0021319 A1    Jan. 24, 2019

Related U.S. Application Data

(63) Continuation of application No. 15/450,208, filed on Mar. 6, 2017, now abandoned.

(60) Provisional application No. 62/304,497, filed on Mar. 7, 2016.

(51) Int. Cl.
*A01N 35/02* (2006.01)
*A01N 37/02* (2006.01)
*A01N 65/34* (2009.01)

(52) U.S. Cl.
CPC .............. *A01N 35/02* (2013.01); *A01N 37/02* (2013.01); *A01N 65/34* (2013.01); *Y02A 50/326* (2018.01)

(58) Field of Classification Search
CPC .............................. A01N 35/02; Y02A 50/326
See application file for complete search history.

(56) References Cited

FOREIGN PATENT DOCUMENTS

WO    WO-2013156492 A2 * 10/2013 ............. A01N 37/02

OTHER PUBLICATIONS

Jordan, M.J. et al. "Volatile Components and Aroma Active Compounds in Aqueous Essence and Fresh Pink Guava Fruit Puree (*Psidium guajava* L.) by GC-MS and Multidimensional GC/GC-O" J. Agric. Food Chem. 2003, 51, 1421-1426 (Year: 2003).*

* cited by examiner

*Primary Examiner* — Andrew S Rosenthal
(74) *Attorney, Agent, or Firm* — John D. Fado; G. Byron Stover

(57) ABSTRACT

Methods of attracting *Drosophila suzukii*, involving treating an object or area with a *Drosophila suzukii* attracting effective amount of a composition containing acetoin and at least one compound selected from ethyl octanoate, acetic acid, ethyl acetate, phenethyl alcohol, or mixtures thereof; wherein said composition does not contain ethanol.

15 Claims, 14 Drawing Sheets

METHODS OF ATTRACTING *DROSOPHILA SUZUKII* USING ACETOIN BLEND

REFERENCE TO RELATED APPLICATION

This is a continuation of application Ser. No. 16/123,496 filed 6 Sep. 2018 which is a continuation of application Ser. No. 15/450,208 filed 6 Mar. 2017, and U.S. Provisional Application No. 62/304,497 filed 7 Mar. 2016, which are herein incorporated by reference in their entirety.

BACKGROUND OF THE INVENTION

Disclosed are methods of attracting *Drosophila suzukii*, involving treating an object or area with a *Drosophila suzukii* attracting effective amount of a composition containing acetoin and at least one compound selected from ethyl octanoate, acetic acid, ethyl acetate, phenethyl alcohol, or mixtures thereof; wherein said composition does not contain ethanol.

The spotted wing drosophila (SWD), *Drosophila suzukii* Matsumura (Diptera: Drosophilidae), is an invasive fruit-infesting fly native to Southeast Asia (Calabria, G., et al., J. Appl. Entomol., 136: 139-147 (2010)). Since it was accidently introduced to the United States in August in California in 2008, *D. suzukii* has rapidly spread across the United States and has been detected in a total of 41 states from CA to ME, as well as Canada, Mexico and Europe (Hauser, M., Pest Manage. Sci., 67: 1352-1357 (2011)). *D. suzukii* attacks a wide variety of fruit and has become a devastating pest of soft-skinned fruit crops, such as raspberries, blueberries, cherries, and strawberries, etc. (Hauser 2011; Beers, E. H., et al., Pest Manage. Sci., 67: 1386-1395 (2011)). Unlike most drosophilid flies that feed and oviposit on overripe fruit, *D. suzukii* can feed and oviposit on ripening fruit (Calabria et al. 2010; Mitsui, H., et al., Popul. Ecol., 48: 233-237 (2006)). The females possess a serrated ovipositor to cut through the epicarp of their hosts. Fruit infestation by *D. suzukii* larvae has resulted in significant financial losses to farmers (Walsh, D. B., et al., J. Integr. Pest Manage., 2: G1-G7 (2011); Cini, A., et al., Bull. Insectol., 65: 149-160 (2012)).

Due to its economic impact on fruit crops, farmers usually resort to calendar-based applications of insecticides to manage *D. suzukii* (Beers et al. 2011; Goodhue, R. E., et al., Pest Manage. Sci., 67: 1396-1402 (2011); Lee, J. C., et al., Pest Manage. Sci. 67, 1349-1351 (2011)). Early detection of this fly on farms is essential for quick management measures, which could lead to reductions in the rate and amount of insecticide applications required to avoid economic loss. To date, SWD populations are monitored by traps that employ fermentation products such as apple cider vinegar (ACV), wine, or yeast as baits (Beers et al. 2011; Lee, J. C., et al., Environ. Entomol., 42, 1348-1355 (2013); Lee, J. C. et al., J. Econ. Entomol., 105: 1350-1357 (2012); Landolt, P. J., et al., J. Appl. Entomol., 136: 148-154 (2012); Landolt, P. J., et al., Fla. Entomol., 95: 326-332 (2012); Kleiber, J. R., et al., Environ. Entomol., 43: 439-447 (2014)). In particular, apple cider vinegar is commonly used because it is easily available and is relatively cheap (Beers et al. 2011; Lee et al. 2011; Lee et al. 2013; Lee et al. 2012). However, apple cider vinegar is not selective; in a study testing different trap designs using apple cider vinegar as bait it was found that only 26-31% of the total numbers of *Drosophila* spp. caught in traps were *D. suzukii* (Lee et al. 2012). In addition, ACV baited traps are ineffective at detecting flies before populations reach an economic injury level, leaving farmers without sufficient time to apply protective treatments. Although an 11-component chemical blend based on raspberry volatiles, and a 8-component blend and a 4-component blend based on wine volatiles have been reported as SWD attractants, they are unsatisfactory for the demands of SWD infestation detection and population monitoring because of poor selectivity and efficiency (Abraham, J., et al., Environ. Entomol., 44: 356-367 (2015); Cha, D., et al., J. Chem. Ecol., 38: 1419-1431 (2012); Cha, D. H., et al., Pest Manage. Sci., 70: 324-331 (2014); Cha, D. H., et al., Entomol. Exp. Appl., 154: 251-260 (2015)).

Thus more effective and selective attractants are needed for detecting, monitoring, and managing this invasive species, especially in early season prior to fruit injury. Herein we report such effective attractants for *D. suzukii*.

SUMMARY OF THE INVENTION

Disclosed are methods of attracting *Drosophila suzukii*, involving treating an object or area with a *Drosophila suzukii* attracting effective amount of a composition containing acetoin and at least one compound selected from ethyl octanoate, acetic acid, ethyl acetate, phenethyl alcohol, or mixtures thereof; wherein said composition does not contain ethanol.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 3 shows behavior response of adult *D. suzukii* (male and female) as described below against blank control in laboratory two-choice bioassay to the following.

deployed at the Beltsville Agricultural Center, Maryland during Oct. 14 to Oct. 21, 2015 as described below. The bars with different letters and superscripts are significantly different at $\alpha=0.05$ (one-way ANOVA, square root transformed, Ryan-Einot-Gabriel-Welsch F test, N=10, df=4.45; for SWD, F=15.78; $p<0.0001$; for other D. spp., F=9.71, $p<0.0001$).

Figure 5:
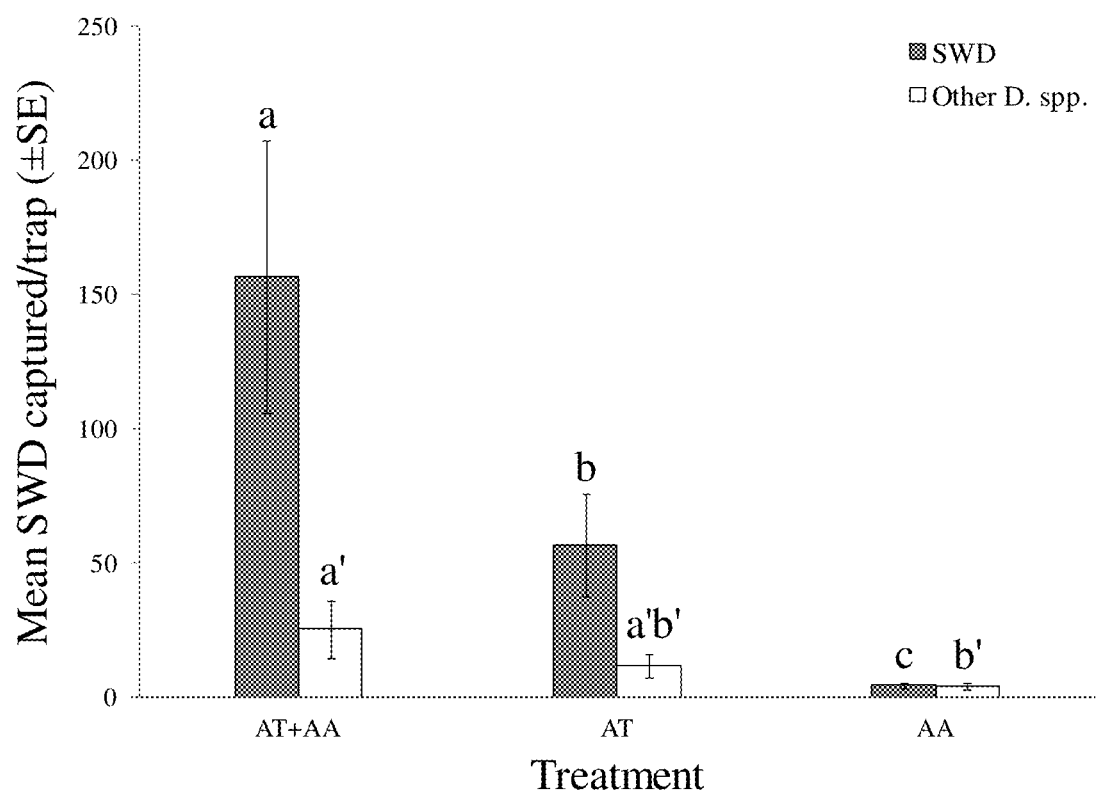

FIG. 5 shows mean weekly catches of *D. suzukii* and other D. spp. in traps baited with different combinations of acetic acid (AA) and acetoin (AT) deployed at the Beltsville Agricultural Center, Maryland during Oct. 21 to Oct. 28, 2015 as described below. The bars with different letters and superscripts are significantly different at $\alpha=0.05$ (one-way ANOVA, square root transformed, Ryan-Einot-Gabriel-Welsch F test, N=15, df=2.42; for SWD, F=12.89, $p<0.0001$; for other D. spp., F=5.93, $p<0.01$).

Figure 6:
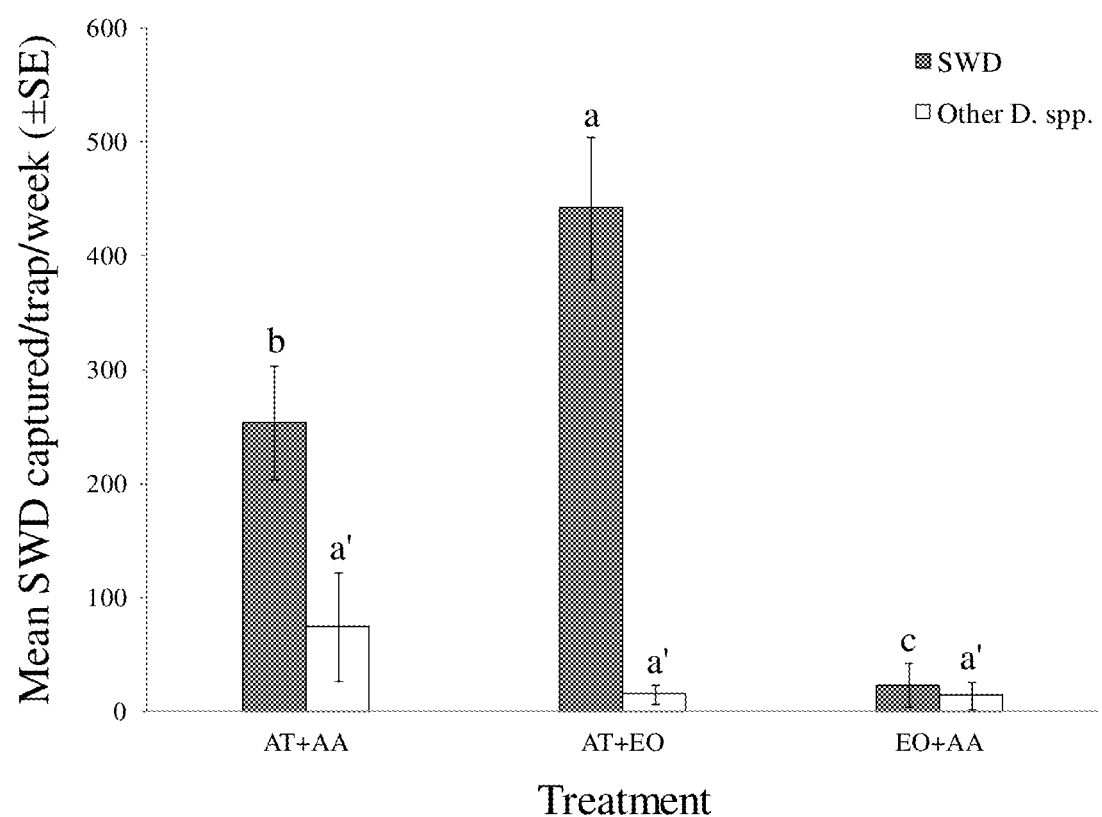

FIG. 6 shows mean weekly catches of *D. suzukii* and other D. spp. in traps baited with different combinations of acetoin (AT), acetic acid (AA), and ethyl octanoate (EO) deployed at the Beltsville Agricultural Center, Maryland during Oct. 28 to Nov. 18, 2015 for three weeks as described below. The bars with different letters are significantly different at $\alpha=0.05$ (one-way ANOVA, square root transformed, Ryan-Einot-Gabriel-Welsch F test, N=3, df=2.6; for SWD, F=7.45, $p<0.05$; for other D. spp., F=1.49, $p=0.30$).

Figure 7:
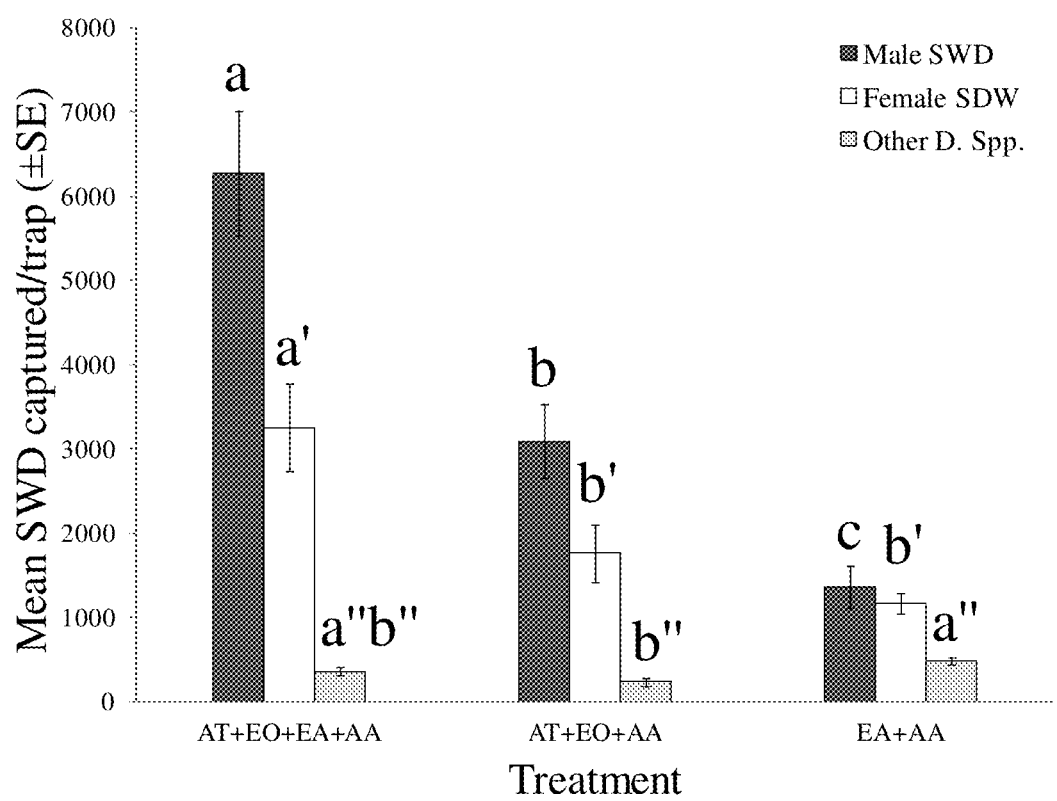

FIG. 7 shows mean weekly catches of *D. suzukii* and other D. spp. in traps baited with different combinations of acetoin (AT), ethyl octanoate (EO), ethyl acetate (EA), and acetic acid (AA) deployed at the Beltsville Agricultural Center, Maryland during Nov. 8 to Nov. 15, 2016 as described below. The bars with different letters and superscripts are significantly different at $\alpha=0.05$ (one-way ANOVA, square root transformed, Ryan-Einot-Gabriel-Welsch F test, N=3, df=2.6; for male, F=63.77, $p<0.0001$; for female, F=16.25, $p<0.01$; for other D. spp., F=7.06, $p<0.05$).

Figure 8:
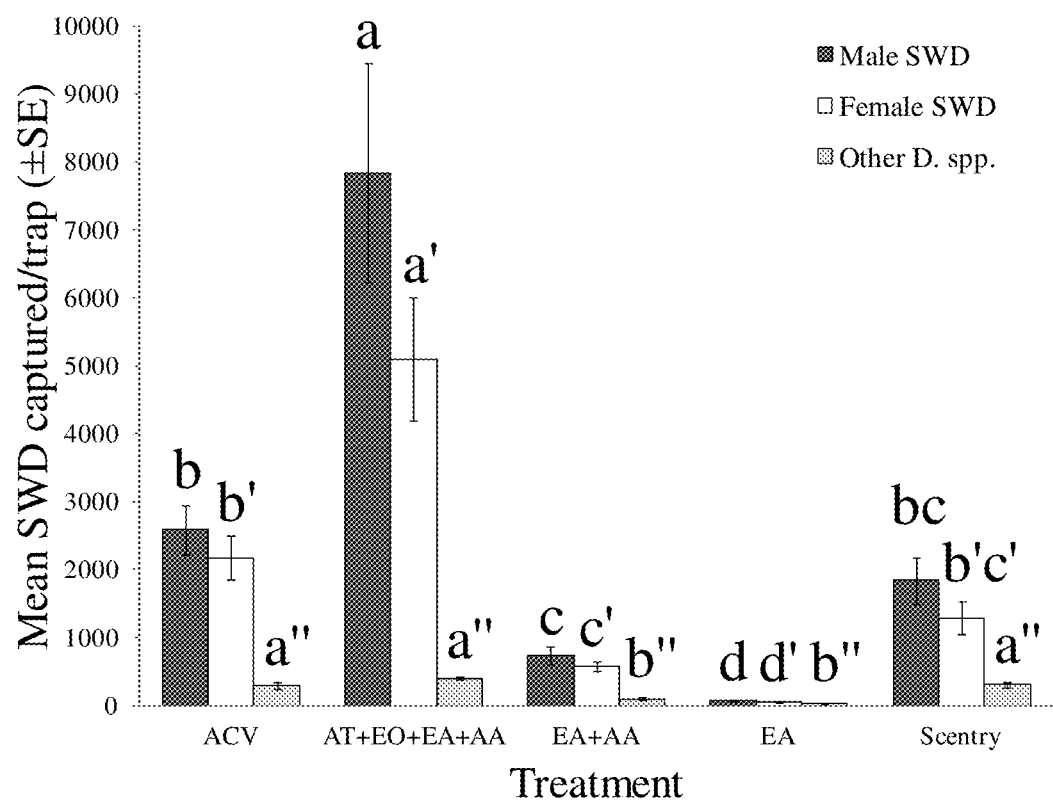

FIG. 8 shows mean trap catches of *D. suzukii* and other D. spp. in traps baited with different combinations of acetoin (AT), ethyl octanoate (EO), ethyl acetate (EA), acetic acid (AA), as well as apple cider vinegar (ACV) and commercial SWD lure from Scentry® (Scentry) deployed at the Beltsville Agricultural Center, Maryland during Nov. 10 to Nov. 18, 2016 as described below. The bars with different letters and superscripts are significantly different at $\alpha=0.05$ (one-way ANOVA, square root transformed, Ryan-Einot-Gabriel-Welsch F test, N=6, df=4.25; for male, F=34.57, $p<0.0001$; for female, F=39.94, $p<0.0001$; for other D. spp., F=26.01, $p<0.0001$).

Figure 9:
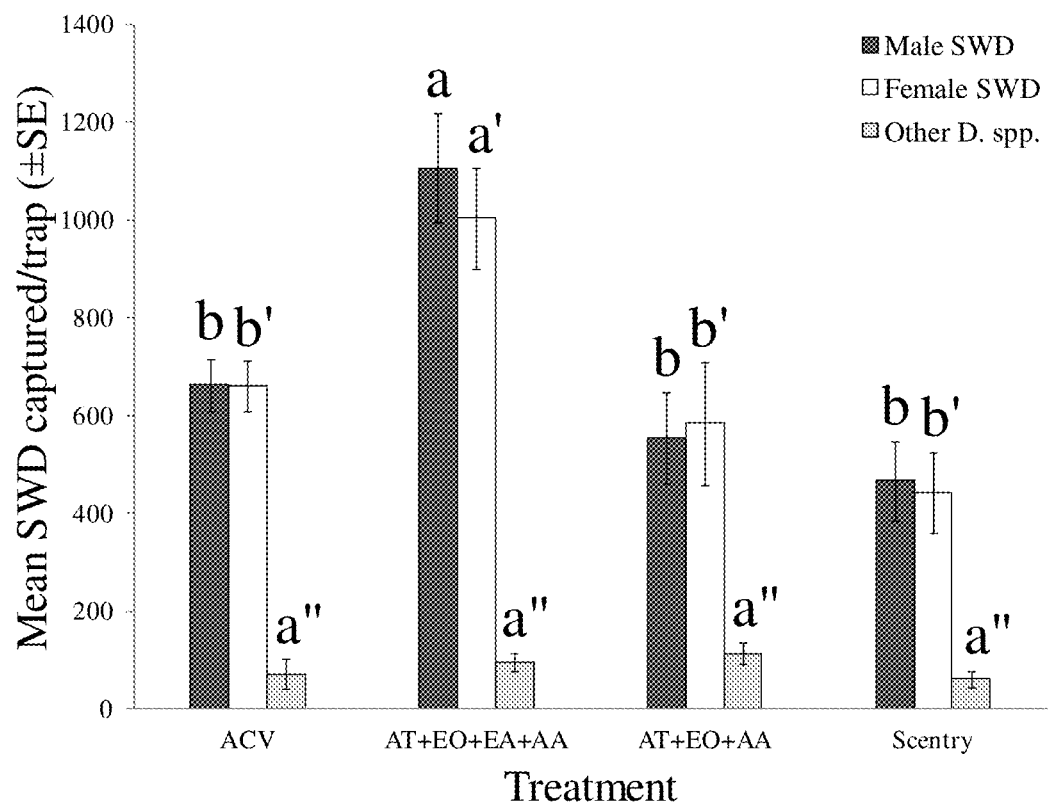

FIG. 9 shows mean trap catches of *D. suzukii* and other D. spp. in traps baited with different combinations of acetoin (AT), ethyl octanoate (EO), ethyl acetate (EA), acetic acid (AA), as well as apple cider vinegar (ACV) and commercial SWD lure from Scentry® (Scentry) deployed at Beltsville Agricultural Center, Maryland during Nov. 25 to Dec. 22, 2016 for 27 days (total trap captures, lures and contents were not changed and collected weekly) as described below. The bars with different letters and superscripts are significantly different at $\alpha=0.05$ (one-way ANOVA, Ryan-Einot-Gabriel-Welsch F test, N=6, df=3.20; for male, F=10.38, $p<0.001$; for female, F=6.36, $p<0.01$; for other D. spp., F=1.12, $p=0.366$).

Figure 10:
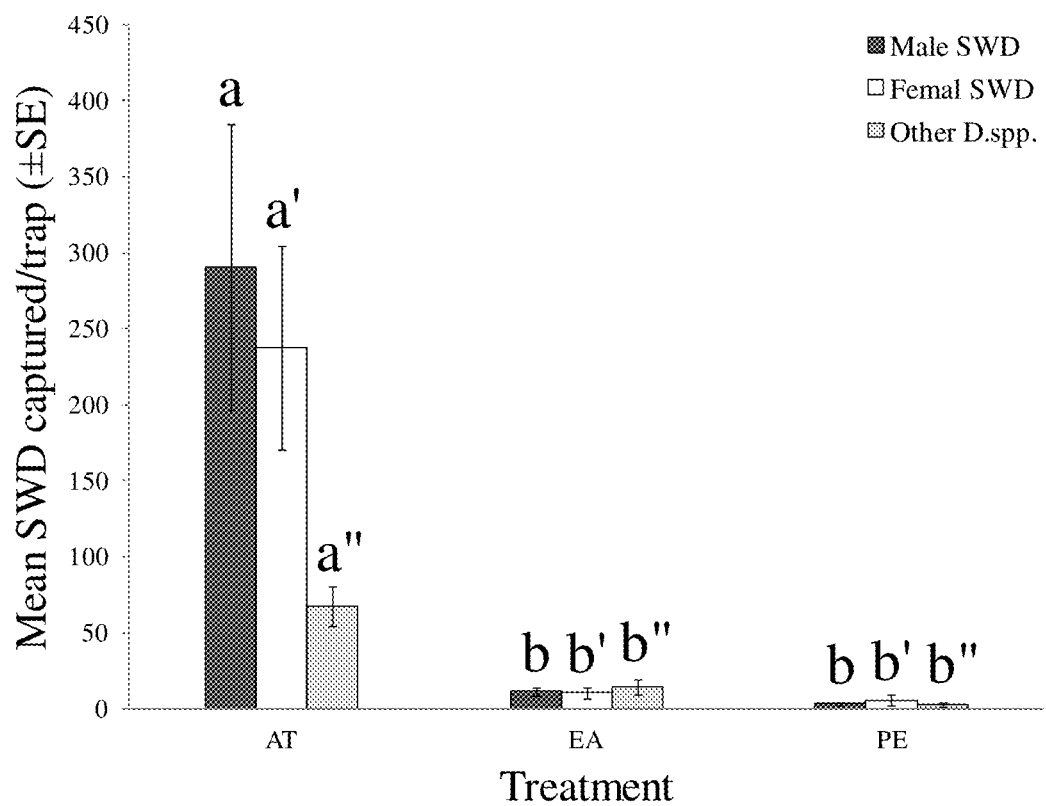

FIG. 10 shows mean trap catches of *D. suzukii* and other D. spp. in traps baited with single component acetoin (AT), ethyl acetate (EA), and phenethyl alcohol (PE) alone (without acetic acid in drowning solution) deployed at the Beltsville Agricultural Center, Maryland during Dec. 2 to Dec. 22, 2016 for 20 days (total trap captures, lures and contents were not changed and collected weekly) as described below. The bars with different letters and superscripts are significantly different at $\alpha=0.05$ (one-way ANOVA, Ryan-Einot-Gabriel-Welsch F test, N=6, df=3.20; for male, F=9.09, $p<0.01$; for female, F=11.55, $p<0.001$; for other D. spp., F=18.61, $p<0.0001$).

Figure 11:
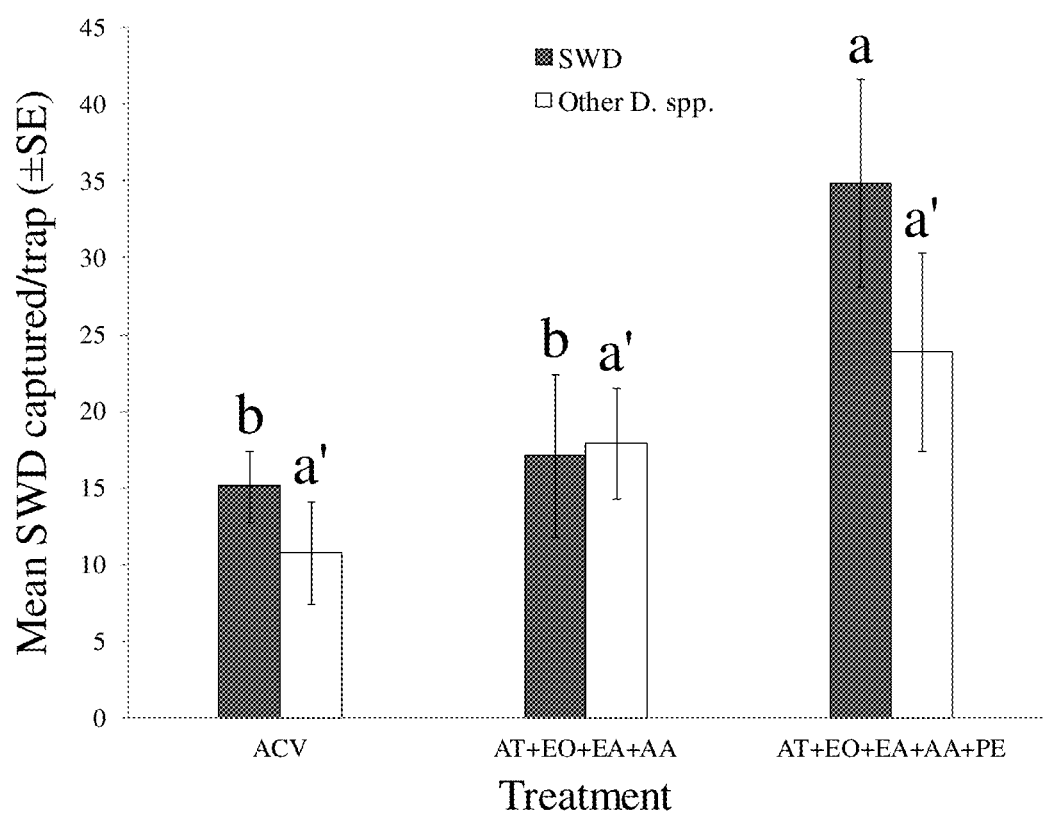

FIG. 11 shows mean trap catches of *D. suzukii* and other D. spp. in traps baited with different combinations of acetoin (AT), ethyl octanoate (EO), ethyl acetate (EA), and acetic acid (AA), phenethyl alcohol (PE), as well as apple cider vinegar (ACV) deployed at blueberry field, Butler Orchard, Md. during Nov. 30 to Dec. 7, 2016 as described below. The bars with different letters and superscripts are significantly different at $\alpha=0.05$ (one-way ANOVA, Ryan-Einot-Gabriel-Welsch F test, N=9, df=2.24; for SDW, F=4.47, $p<0.05$; for other D. spp., F=1.96, $p=0.163$).

Figure 12:
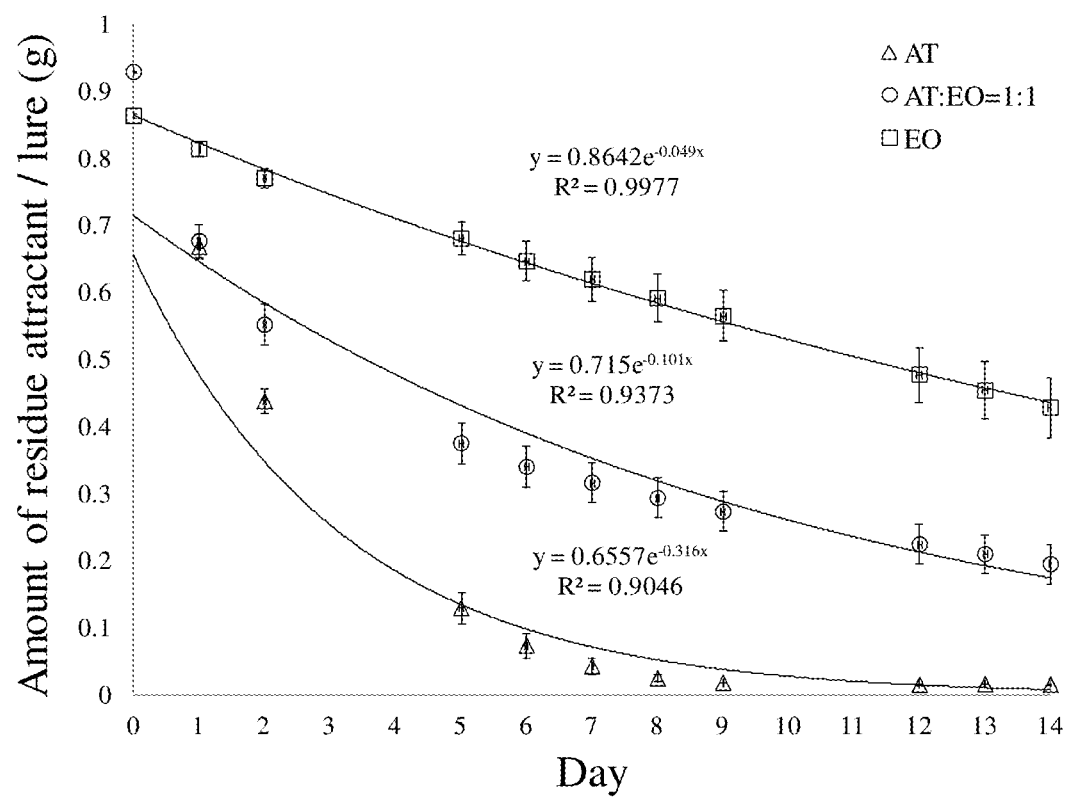

FIG. 12 shows residuals ($\pm$SE) of acetoin (AT), ethyl octanoate (EO), and blend of AT and EO (ratio=1:1) measured in micro-centrifuge tube dispensers after exposure under fume hood conditions for a period of two weeks as described below.

DETAILED DESCRIPTION OF THE INVENTION

Disclosed are methods of attracting *Drosophila suzukii*, involving treating an object or area with a *Drosophila suzukii* attracting effective amount of a composition containing acetoin and at least one compound selected from ethyl octanoate, acetic acid, ethyl acetate, phenethyl alcohol, or mixtures thereof; wherein said composition does not contain ethanol.

The work presented herein is focused on further research towards developing more effective and selective attractants for *D. suzukii* based on volatiles from fruit aromas. Since apple cider vinegar and some ripening fruits are historically the most attractive baits, headspace volatiles collected from fresh and fermented apple juices were compared. Special attention was given to the compounds produced and/or enriched during the fermentation process. Chemical analyses of the headspace volatiles of apple juice by gas chromatography-mass spectrometry (GC-MS) revealed twenty aromas, of which ten were related to the fermentation. After conducting a series of two-choice laboratory bioassays and field tests, a quinary chemical blend, including acetoin (AT) as a long-range attractant, ethyl octanoate (EO) as a short-range attractant, and acetic acid (AA), ethyl acetate (EA), phenethyl alcohol (PE) as synergistic agents (AT+EO+AA+EA+PE), was surprisingly identified as an efficient attractant for *D. suzukii*, which was more attractive and selective than the widely-used ACV and a commercially-available Scentry® SWD lure under field conditions. This newly identified quinary chemical blend is expected to lure SWD flies more efficiently and selectively into traps in the early season and attract them to insecticide strips or biocontrol dispensers. It will be vital for SWD infestation detection and population monitoring in support of SWD management programs. The new blend will also enable future development of mass trapping, attract-and-kill, and push-and-pull technologies for control of this exotic pest.

The compounds described herein (useful, for example, in attracting *Drosophila* suzukii) may be applied with a carrier component or carrier (e.g., agronomically or physiologically or pharmaceutically acceptable carrier). The carrier component can be a liquid or a solid material. As is known in the art, the vehicle or carrier to be used refers to a substrate such as a membrane, hollow fiber, microcapsule, cigarette filter, gel, polymers, bags, vials, septa, or the like. All of these substrates have been used to release volatile chemicals in general and are well known in the art. Suitable carriers are well-known in the art and are selected in accordance with the ultimate application of interest. Agronomically acceptable substances include aqueous solutions, oils, glycols, alcohols, ketones, esters, hydrocarbons, halogenated hydrocarbons, polyvinyl chloride; in addition, solid carriers such as clays, cellulosic, fibers, and rubber materials and synthetic polymers. The carrier or carrier material as used herein is defined as not including the body of an insect (e.g., *Drosophila suzukii*).

The amount of the composition for attracting *Drosophila suzukii* used will be at least an effective amount (i.e., 1 mg or more). The term "effective amount," as used herein, means the minimum amount of the composition needed to attract *Drosophila suzukii* to a treated area or object or locus when compared to the same area or object or locus which is untreated. Of course, the precise amount needed will vary in accordance with the particular composition used; the type of area or object to be treated; the number of days of attractiveness needed; and the environment in which the area or object or locus is located. The precise amount of the composition can easily be determined by one skilled in the art given the teaching of this application. For example, one skilled in the art could follow the procedures utilized below; the composition would be statistically significant in comparison to a control (e.g., water). Generally, the concentrations of synthetic chemicals discussed herein on polypropylene flex tube or plastic bag would range from about 10 mg to about 250 mg (e.g., 10 to 250 mg), monitoring traps would generally use about 50 mg while attract and kill may use about 250 mg (e.g., 250 mg), and release rates could generally be about 0.05 to about 30 mg (e.g., 0.05 to 30 mg) per tube/bag per day.

The compositions described herein may or may not contain a control agent for *Drosophila suzukii*, such as a biological control agent or an insecticide known in the art to kill *Drosophila suzukii*. Other compounds may be added to the composition provided they do not substantially interfere with the intended activity of the composition; whether or not a compound interferes with attractant activity can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 10% to a reference quantity, level, value or amount.

Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Apple juice headspace volatile collections and raspberry solvent extract preparation: The headspaces of apple juice were collected using fresh and fermented Old Orchard® Apple Juice (local Shoppers Food and Pharmacy, College Park, Md.). Fresh apple juice (250 ml) was introduced into a 1 L, 4-necked glass container (Zhang, A., et al., J. Chem. Ecol., 25: 1221-1232 (1999); Zhang, A., et al., J. Chem. Ecol., 20: 2415-2427 (1994)). Air was drawn into the container through 6-14 mesh activated charcoal (Fisher Scientific, Pittsburgh, Pa.), and out of the container through two traps (15 cm×1.5-cm o.d.) containing Super Q (200 mg each; Alltech Associates, Inc., Deerfield, Ill.) by vacuum (~1 l/min). For fresh apple juice volatile collection, aeration was conducted for 3 hr at room temperature and 16:8 h (L:D) photoperiod. Adsorbents were eluted with methylene chloride (4×0.5 ml); the eluates (2 ml/each sample) were concentrated to ~500 µL under a nitrogen stream and stored at −30° C. for future GC-MS analysis. For fermented apple juice volatile collection, the same container was set on the laboratory bench top for 20 days until the apple juice fermentation occurred inside, then aeration was conducted for 3 hr and absorbent elution was carried out at the same manner as fresh apple juice volatile. A polydimethylsiloxane-coated solid phase microextraction (SPME) fiber (PDMS. 100 µm, Supelco Inc., Bellefonte, Pa.) was used for apple juice SPME sampling (Zhang, A. et al., J. Chem. Ecol., 25 (6): 1221-1232 (1999)). Raspberry extract was prepared at Rutgers University from fresh raspberry fruit (Driscoll Strawberry Associates, Inc., Watsonville, Calif.) by homogenized blending and centrifuging. The resulting dark-blue water extracts containing water-soluble organic substances were stored in a freezer (−10° C.) for laboratory bioassay and chemical analysis (Abraham, J., et al. 2015).

GC and GC-MS spectrometry: The GC and electronic impact (EI) GC-MS systems used were as previously described (Zhang, A., et al., Proc. Natl. Acad. Sci. USA, 101: 9601-9606 (2004)). A Hewlett Packard (HP) 6890 GC was coupled to a flame ionization detector (FID) using DB-WAXETR or DB-5 capillary column (60 m×0.25-mm i.d., 0.25-µm film-thickness (J&W Scientific Inc., Folsom, Calif.). Oven temperature was started at 50° C. for 2 min, then programmed to rise to 230° C. at 15° C./min and held for 20 min in the splitless mode with hydrogen as carrier (2 mL/min). For GC-MS analysis, a Hewlett Packard (HP) 6890 GC was coupled to a HP 5973 Mass Selective Detector (MSD) using the same columns as GC-FID, but with helium as carrier (1.4 mL/min). A 70 eV electron beam was employed for sample ionization. The chemical identification of the headspace volatiles was based on comparison of their mass spectra with the NIST and Wiley mass spectral libraries and identities were confirmed by mass spectra and GC retention times of authentic standards on both polar and non-polar GC capillary columns ((Zhang, A. et al., J. Chem. Ecol., 25 (6): 1221-1232 (1999))). The ratios of components were determined by using GC-FID.

Insect rearing: Lab-reared SWD flies were obtained from Rutgers University. The original colony was established in July 2012 from *D. suzukii*-infested blueberry (*Vaccininum corymbosum* cv. Bluecrop) fruits in Burlington County, N.J. (Abraham, J., et al. 2015). Insects were reared on cornmeal diet (Dalton, D. T., et al., Pest Manage. Sci., 67: 1368-1374 (2011)) in polystyrene vials (height, 95 mm, diameter, 28.5 mm, Fisher Scientific, PA, USA) with ventilated plugs (height 25 mm, diameter 28.5 mm, Fisher Scientific, PA). The colony was maintained in an incubator under ~25° C., 60% RH and a 16:8 h (L:D) photoperiod. Maintenance of the *D. suzukii* colony was achieved by transferring emerging adults into new diet tubes on a weekly basis. All *D. suzukii* used in bioassays were counted and sexed based on the presence of a dark spot on the wing tips of males and the presence of a serrated ovipositor in females (Walsh, D. B. et al., J. Integr. Pest Manage., 2 (1): G1-G7 (2011)) for overall colony sex ratio determination. The sex ratio of lab-reared *D. suzukii* was determined to be close to 1:1.

Chemicals: All chemicals ((2) isobutanol (IB), 99+%, CAS 78-83-1; (6) 2-methyl-1-butanol (2MB), 99+%, CAS 137-32-6; (6) 3-methyl-1-butanol (3MB), 98.5+%, CAS 123-51-3; (8) ethyl hexanoate (EH), 99+%, CAS 123-66-0; (10) 3-hydroxy-2-butanone (acetoin, AT), 99%, CAS 512-86-0; (14) ethyl octanoate (EO), 99+%, CAS 106-32-1; (15) acetic acid (AA), 99.7+%, CAS 64-19-7; benzaldehyde (BA), CAS 100-52-7; 98+%; (18) ethyl decanoate (ED), 99+%, CAS 110-38-3; (19) methyl benzoate (MB), 99%, CAS 93-58-3; (20) phenethyl alcohol (PE), 99+%, CAS 60-12-8 (FIG. 1); as well as ethanol (EtOH), 200 proof HPLC grade, ethyl acetate, methylene chloride, and pentane, HPLC grade) in this work were purchased from Sigma-Aldrich (St. Louis, Mo.). The chemicals were used without further purification. Pentane was used as a solvent for dilution when lower-than-stock concentrations of any of the aforementioned chemicals were required.

Field test: Commercially-available Victor® yellowjacket and flying insect traps (Great Lakes IPM Inc., Vestaburg, Mich.) filled with ~300 mL of tap water containing a surfactant (Seventh Generation™ natural dish liquid—free and clear, Shoppers Food and Pharmacy, College Park, Md., 4 mL/gallon) as a drowning solution were used in all field tests at the Beltsville Agricultural Research Center-West, Beltsville, Md. (10300 Baltimore Ave., Beltsville, Md.) and at the blueberry field at Butler's Orchard (22222 Davis Mill Rd, Germantown, Md.). Unless otherwise indicated, pure chemical (individual or blend, 1 mL) was loaded onto a cotton ball held within a polypropylene flex micro-centrifuge tube (1.5 mL Eppendorf micro-centrifuge tube, VWR International, Radnor, Pa.) and the lid of the tube was then closed. Tubes filled only with a cotton ball were used as blank controls. The micro-centrifuge tube lure was opened and the lid was snapped into one of four holes on the cap of the Victor® trap, leaving the three remaining holes to serve as entrances for attracted insects. At the Beltsville Agricultural Research Center, traps were hung from the branches of trees on the edge of a small woodlot in blocks consisting of 3-5 treatments and 1 blank control with the traps spaced approximately 5 m apart within a group. The treatments were randomly arranged at different positions within the block and blocks were separated by 10-20 m. At the blueberry field in Butler's Orchard, traps were hung from the branches of blueberry bushes, deployed in blocks consisting of 3 treatments with the traps spaced approximately 5 m apart in a group. The traps were randomly arranged at different positions within the block and blocks were separated by 10-20 m.

The preliminary field tests were conducted at the Beltsville Agricultural Research Center during Oct. 17 to 24, 2014, using six different lures: (1) apple juice blend (treatment 1, 7-components based on apple juice fermentation products (FIG. 1), including isobutanol (IB):2-methyl butanol (2MB):3-methyl butanol (3MB):ethyl hexanoate (EH): acetoin (AT):ethyl octanoate (EO):methyl benzoate (MB) in natural ratios of 4:7:7:0.3:1:0.3:2) (v/v)), (2) raspberry blend (11-components blend, including butyl acetate:hexanal:2-heptanone:3-methyl-butanol:trans-2-hexenal:3-methyl-2-butyl acetate:2-heptanol:hexanol:cis-3-hexenol:6-methyl-5-hepten-2-ol:linalool; obtained from Sigma-Aldrich; mixed into an 11-component blend in natural ratios of 1:36:3:5:10: 2:7:8:9:2:8 (v/v), respectively))(Abraham, J. et al., Environ. Entomol., 44 (2): 356-367 (2015)), (3) single component (2-methyl butanol (2MB)), (4) 3-methyl butanol (3MB), (5) binary components blend ((2MB+3MB in 1:1 ratio)), and (6) blank control. In 2015 and 2016, three additional treatments were formulated: treatment 14 ((2-components, including acetoin (AT) and ethyl octanoate (EO) in 1:1 ratio), treatment 16 (single-component, acetoin (AT)), and treatment 17 (single-component, ethyl octanoate (EO)). The rest of the compounds, including ethanol (EtOH) (10 mL) and acetic acid (AA) (1 mL), were added into drowning water and evaluated as individual attractant or synergistic attractive agent whenever needed. In 2016, ACV (300 mL, Essential Everyday®, 5% acidity, Shoppers Food and Pharmacy, College Park, Md.) and a commercially-available Scentry® SWD lure (Great Lakes IPM Inc., Vestaburg, Mich.) were used as standard lures for SWD attraction activity comparison. The amount of AA in the drowning solution in each trap was increased from 1 mL to 15 mL to reach the same acidity (5%) with ACV. In addition, ethyl acetate (EA) (5 mL) and phenethyl alcohol (PE) (1 mL) were added to the drowning solution and evaluated as individual attractants or synergistic attractive agents. Lure dispenser tubes and trap drowning solutions with captured insects were collected and replaced every week unless otherwise indicated. Flies were counted in the laboratory. *D. suzukii* flies were identified with dissecting scopes based on the presence of a dark spot on the wing tips of males and the presence of the serrated ovipositor in females (Walsh et al. 2011). Field-collected *D. suzukii* flies from a preliminary test conducted in 2014 were also sent to the Systematic Entomology Laboratory, USDA, ARS in Beltsville, Md., for taxonomic identification. Other *Drosophila* species collected in the traps were not identified and cited as "other D. spp." Because the blank control traps caught almost nothing during preliminary field tests conducted in 2014, they were not included in the subsequent field tests.

Figure 2:
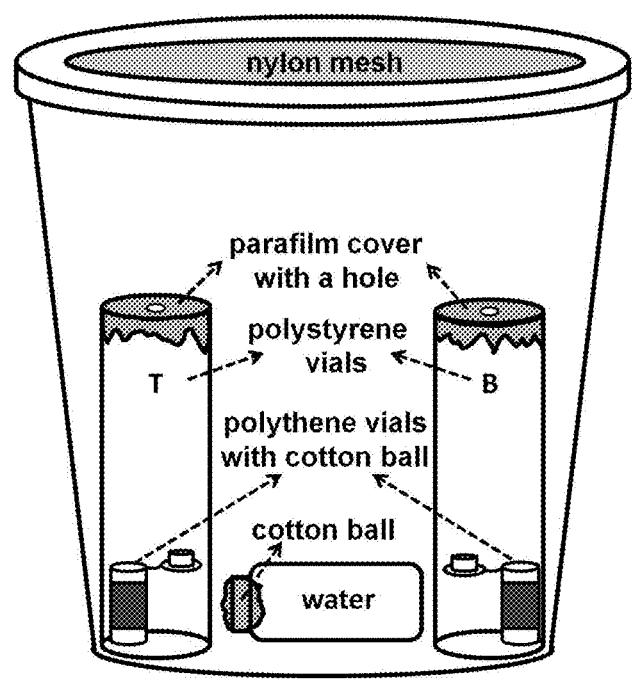
FIG. 2 shows laboratory two-choice bioassay device (clear plastic cup) used in experiment as described below; T: treatment vial, B: blank control vial.

Laboratory behavioral bioassay: To identify the key components for *D. suzukii* attraction from the apple juice 7-components blend, a two-choice laboratory bioassay (testing chemical or chemical blend vs. blank control) was used and different combinations of 7-components were evaluated. A complete test apparatus consisted of a plastic cup containing two trap tubes with two lure vials, and a water wick (FIG. 2). The plastic cups were clear, cylindrical polypropylene food containers (946 mL, diameter 114 mm, height 127 mm, Paper Mart, CA). The lid of each cup had an 80 mm diameter circular hole cut in it, which was covered with a nylon mesh (no-*thrips* insect screen, mesh size: 81×81, Bioquip, CA) to provide ventilation while retaining flies. The polystyrene trap tubes (95 mm×28.5 mm, same as those used in insect rearing) were labeled "T" for treatment and "B" for blank control, respectively, and were then given the appropriate lure. Lures were either tested chemical/chemical blends (unless otherwise indicated, 20 µL pure individual or blend) loaded onto a small cotton ball held within a small polyethylene lure vial (26 mm×8 mm×1.5 mm thickness, Just Plastic Ltd., Norwich, UK) or blank controls of plain cotton or cotton with solvent (in dose response trials) held in the same type of small lure vial. Each lure vial (open lid) was placed vertically within its trap tube and then the top of each trap tube was sealed with Parafilm® (Pechiney plastics packaging Inc. Menasha, Wis.) leaving only a 4 mm diameter hole in the center to provide an entrance for attracted flies. Each pair of loaded trap tubes were then placed vertically on opposite sides of the test cups with the entrance holes facing upwards. A water wick consisting of a glass scintillation vial (20 mL, VWR, PA) filled with deionized water and plugged with a cotton ball was laid on the bottom of the plastic cup to serve as a water source for the flies during the experiment (FIG. 2). Flies were immobilized using a $CO_2$ stream and 10 were transferred into each testing apparatus. The fully-assembled test apparatus cups were then covered with their ventilated lids. All assays were conducted in a fume hood (120-cm-length×60-cm-width× 70-cm-height) using new lures and young flies (2-8 days post-eclosion) under 25° C., 60% RH, and a 16:8 hour (L:D) photoperiod. Mixed-sex *D. suzukii* were used in bioassays unless stated otherwise, and all flies within and outside treatment and control trap tubes were counted and sexed after 48 hours.

Lure Release Rate: Release rates of three different kinds of attractants, including acetoin (AT), ethyl octanoate (EO), and a blend of AT and EO (ratio=1:1), were measured under controlled conditions in a laboratory fume hood. Each attractant (1 mL) was loaded onto cotton balls held in open micro-centrifuge tubes (1.5 mL, VWR International, Radnor, Pa.). Fifteen of these micro-centrifuge tubes (five of each tested attractant) were suspended on hooks in a fume hood (temperature: 20-25° C., face velocity: 129 feet/min). Each tube was weighed every 24-h or 72-h (weekend) and the amount of attractant residue was calculated and recorded over a period of two weeks.

Statistical analysis: Data from bioassay that evaluated the SWD response to treatment trap tubes versus control vials in two-choice tests were converted to proportions and analyzed using G-tests (Sokal, R. R., and F. J. Rohlf, Biometry: the principles and practice of statistics in biological research, Third edition, W.H. Freeman and Company, New York, 1995) with the null hypothesis that *D. suzukii* would be in a 1:1 distribution. The mean number of *D. suzukii* in different treatment vials for laboratory assays and in different treatment traps in field trials were compared by one-way analysis of variance (ANOVA) followed by Ryan-Einot-Gabriel-Welsch F test (SPSS 10.0 for Windows) (George, D., and P. Mallery, SPSS for Windows step by step: A simple guide and reference. 4th ed., Allyn & Bacon, 2002). Some data ranges showed a strong positively-skewed distribution; therefore, square root transformations were performed to remedy non-normality prior to statistical analyses. All statistical comparisons were considered for significance at $\alpha=0.05$.

Figure 1:
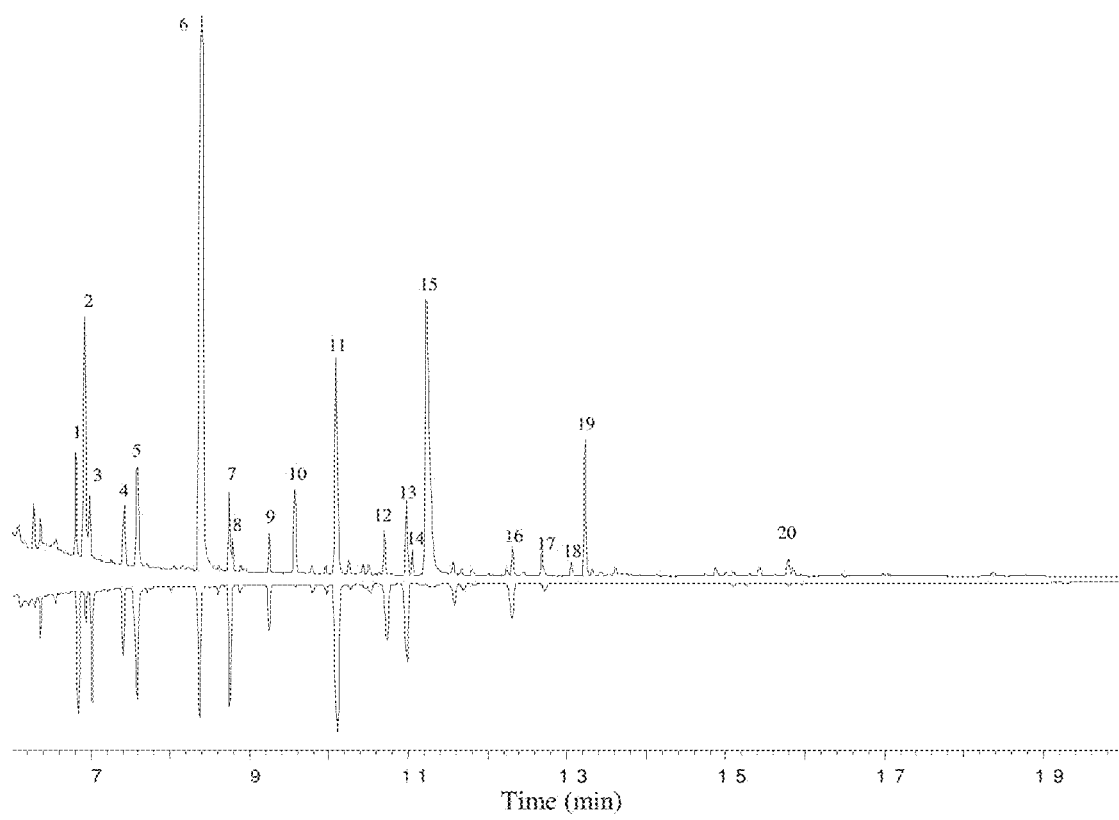
FIG. 1 shows gas chromatography-mass spectrometry (GC-MS) traces (total ion) of apple juice volatile extracts of fermented (top) versus fresh (bottom) as described below: 1. butyl acetate, 2. isobutanol, 3. hexanal, 4. 2-methybutyl acetate, 5. butanol, 6. 2- and 3-methylbutanol, 7. trans-2-hexenal, 8. ethyl hexanoate, 9. hexyl acetate, 10. 3-hydroxy-2-butanone (acetoin), 11. hexanol, 12. trans-2-hexenol, 13. unknown. 14. ethyl octanoate, 15. acetic acid, 16. benzaldehyde, 17. dimethyl sulfoxide, 18. ethyl decanoate, 19. methyl benzoate. 20. phenethyl alcohols.

Identification of volatile compounds from apple juices: Gas chromatography-mass spectrometry (GC-MS) analyses of apple juice headspace extracts revealed that several volatile compounds were present in comparable amounts in both fresh and fermented samples (FIG. 1). However, consistently-higher levels (>10× fold-ratio relative to fresh apple juice volatile extract) of five compounds were associated with fermented apple juice volatile extract (FIG. 1, top trace). The compounds were identified as 2. isobutanol (IB), 6. 2-and 3-methylbutanol (2 and 3MB), 10. (3-hydroxy-2-butanone ((also called acetoin (AT)), and 15. acetic acid (AA) in an approximate ratio of 4:7:7:1:8 (v/v), respectively. Four compounds, including 8. ethyl hexanoate (EH), 14. ethyl octanoate (EO), 18. ethyl decanoate (ED), and 19. methyl benzoate (MB), were only produced by the fermentation in an approximate ratio of 0.3:0.3:0.2:2 (v/v), respectively, and absent in fresh apple juice volatile sample (FIG. 1, bottom trace). Compound 20, phenethyl alcohol, was also a volatile component enriched by fermentation. Two additional compounds, ethyl acetate (EA) and ethanol (EtOH), were detected as major headspace volatile components by solid phase microextraction (SPME) sampling method from both fresh and fermented apple juices. They were masked by solvent peak in conventional GC-MS analyses of apple juice headspace extracts.

Initial field tests: During a one week preliminary test from Oct. 17 to 24, 2014, a total of 845 adult *D. suzukii* was captured in the traps baited with apple juice 7-component blend (treatment 1), 230 *D. suzukii* were trapped in traps baited with raspberry 11-component blend (Abraham et al. 2015), and only 17 *D. suzukii* were caught in 2MB+3MB blend, 2MB, or 3MB (the most abundant components in fermented apple juice), and blank control traps. Our data demonstrated that traps baited with treatment 1 (7-component synthetic blend) captured significantly more male and female *D. suzukii* than the traps baited with other treatments and blank control (N=3, F=120.00; df=5.12; P<0.001) (Table 1), indicating that the apple juice 7-component blend (treatment 1) contained some critical attractive components to attract *D. suzukii*.

Figure 3A:
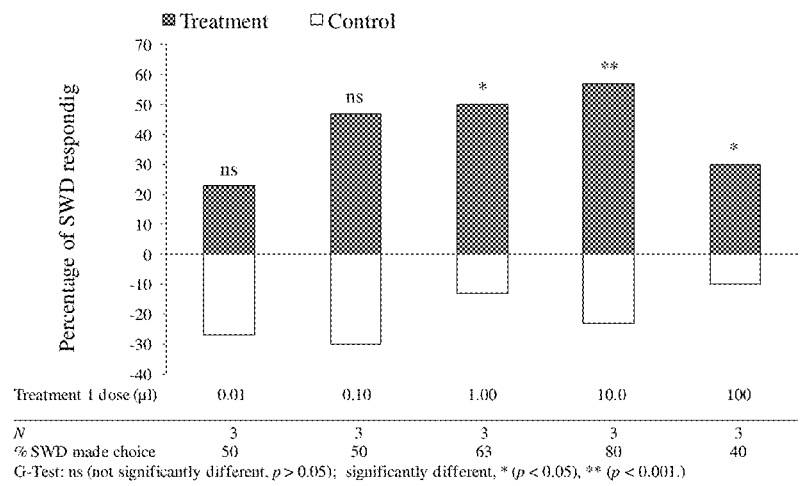
(FIG. 3A) treatment 1 (7-components, 0.01 to 100 µl dose response)
Figure 3B:
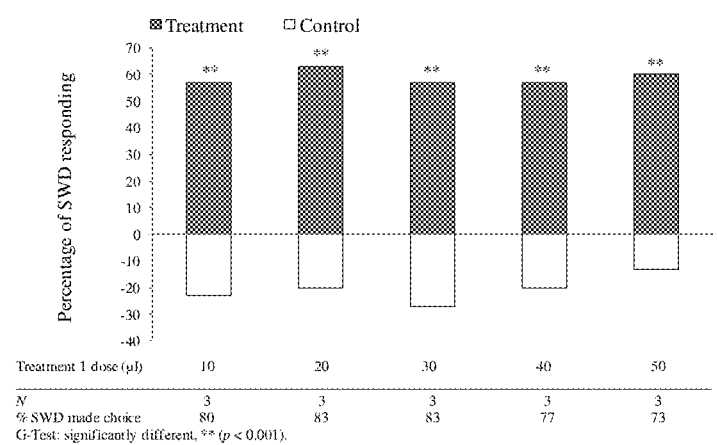
(FIG. 3B) treatment 1 (7-components, 10 to 50 µl dose response)

Laboratory two-choice bioassays—dose response of apple juice 7-component blend: Given that the apple juice 7-component blend (treatment 1) was attractive to *D. suzukii* in the field, a dose response experiment was first carried out in the laboratory two-choice bioassay (FIG. 2) to determine the optimized dose to be used in consequent laboratory experiments for attractive component identification. The doses above 1 μL (~1 mg) were found to be attractive in a series of doses (0.01, 0.1, 1, 10, and 100 μL) when treatment 1 blend was tested (FIG. 3A) (N=3, P<0.05 for 1 and 100 μL, P<0.001 for 10 μL). A further dose response experiment, using 10, 20, 30, 40, and 50 μL, was conducted. Similar activities were obtained and no significant differences were found in this dose range (FIG. 3B) (N=3, P<0.001). Therefore, unless otherwise indicated, an amount of 20 μL (~20 mg) for each chemical or blend was used as standard dose in all of the rest of the experiments. Because the sex ratios of *D. suzukii* were found to be close to 1:1 in all of the trap and control tubes, sex ratio determination was omitted in subsequent laboratory experiments.

Figure 3C:
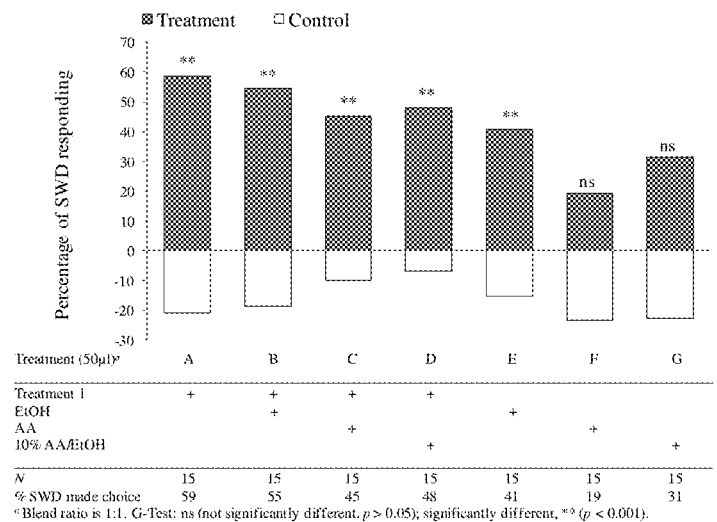
(FIG. 3C) treatment 1 (7-components, effects of ethanol, acetic acid, and 10% acetic acid/ethanol solution)

Laboratory two-choice bioassays—effects of ethanol and acetic acid to apple juice 7-component blend: Since EtOH and AA have been previously reported as the major SWD attractants (Cha, D. H., et al., Pest Manage. Sci., 70 (2): 324-331 (2014)), they were examined individually and in different combinations with treatment 1 (50 μL total volume). Results surprisingly indicated that treatment 1 (A) and EtOH alone (E), as well as combinations of treatment 1 with EtOH (B), AA (C), 10% AA in EtOH (D) were significantly more attractive compared to a blank control (FIG. 3C) (N=15, P<0.001), while AA (F) and 10% AA/EtOH (G) alone were not attractive, and no synergistic effects were observed when treatment 1 blend were combined with EtOH (B), AA (C) and 10% AA/EtOH (D) treatments (FIG. 3C).

Figure 3D:
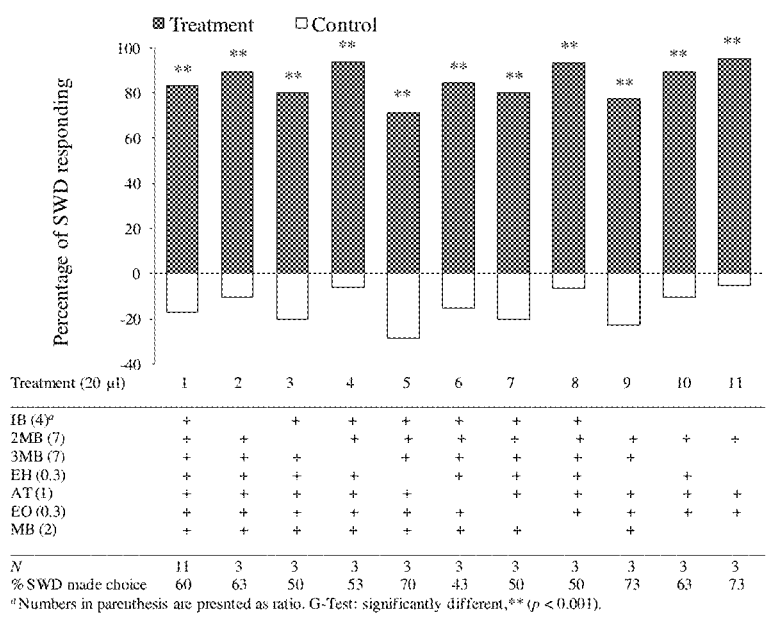
(FIG. 3D) treatment 1 (7-components), 2-8 (6-components), 9 (5-components), and 10 (4-components), and 11 (3-components)
Figure 3E:
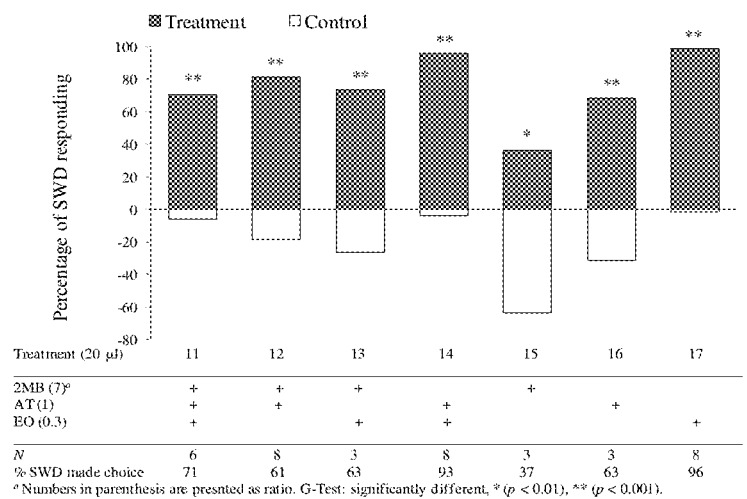
(FIG. 3E) treatments 11 (3-components), 12, 13, 14 (2-components), and 15, 16, 17 (single component)
Figure 3F:
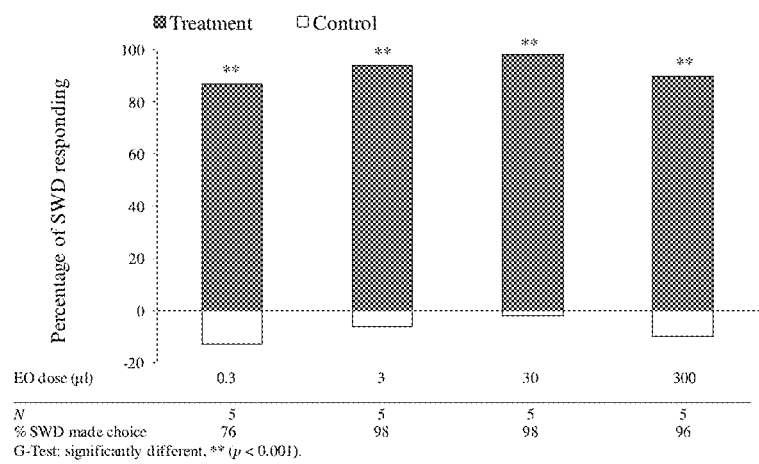
(FIG. 3F) treatment 17 (single component, EO, 0.3 to 300 µl dose response). Data are percent of flies choosing one of the tubes 48 h after release. Experiments were replicated 3-15 times with 10 flies each. Trapping data were analyzed by G-tests: ns (no significantly different, $p>0.05$); significantly different, *($p<0.05$), **($p<0.001$).

Laboratory two-choice bioassays—determination of key components from the apple juice 7-component blend: To determine the key attractive components from the 7-component synthetic blend (treatment 1), seven 6-component blends (treatments 2 to 8) were prepared by eliminating one component from treatment 1 and one 5-, 4-, and 3-component (treatments 9 to 11) blends were prepared by eliminating two, three, and four components, respectively, and evaluated compared to treatment 1 (FIG. 3D). Although no significant activity reduction was observed in this component exclusion experiment (N=3-11, comparing with blank control, P<0.001), the 3-component blend (treatment 11) surprisingly showed the same attractive capacity as the complete treatment 1 blend, indicating that this blend (2MB, AT, and EO) may contain the key attractive components (FIG. 3D). Consequently, this 3-component blend (treatment 11) was further tested as 2-component blends and as individual components. The results clearly demonstrated that an individual component, 2MB (treatment 15), surprisingly exhibited repellent effect. When 2MB was used alone, blank control tubes surprisingly trapped significantly more *D. suzukii* than the 2MB treatment tubes (treatment 15, FIG. 3E). In addition, 2MB surprisingly elicited the lowest percentage response from *D. suzukii*. Surprisingly, compared with the attractant component ethyl octanoate (EO, treatment 17) in which 96% of *D. suzukii* made choice, only 37% of *D. suzukii* made choice when 2MB was present (treatment 15, FIG. 3E). However, surprisingly the treatments 16 (AT) and 17 (EO) individually elicited attraction to *D. suzukii* and EO was the most attractive component (N=3-8, P<0.01 for treatment 15 and P<0.001 for all the other treatments, FIG. 3E). Different doses of EO (from 0.3 µL to 300 µL levels) were examined to determine whether the amount of this compound loaded on the bait might affect the biological activity. Significantly attractive activities were observed for all doses tested in this assay, surprisingly even at the lowest dose 0.3 µL (0.3 mg) (N=3, P<0.001) (FIG. 3F).

Laboratory two-choice bioassays—activity comparison of ethyl octanoate with raspberry extract: Effectiveness of treatment 17 (EO, single-component) was compared with treatment 1 (7-component blend), treatment 11 (3-component blend), treatment 14 (2-component blend), and raspberry extract (50 µL loading). Trap vials baited with the single-component, EO, surprisingly captured significantly more *D. suzukii* than trap vials baited with treatment 1 (7-components) and treatment 11 (3-components). In addition, EO (treatment 17) was also surprisingly as attractive as treatment 14 (2-components, composed of EO and AT) and natural raspberry extract (Table 2) (N=5, F=10.167, df=4.20, P<0.001).

Figure 4:
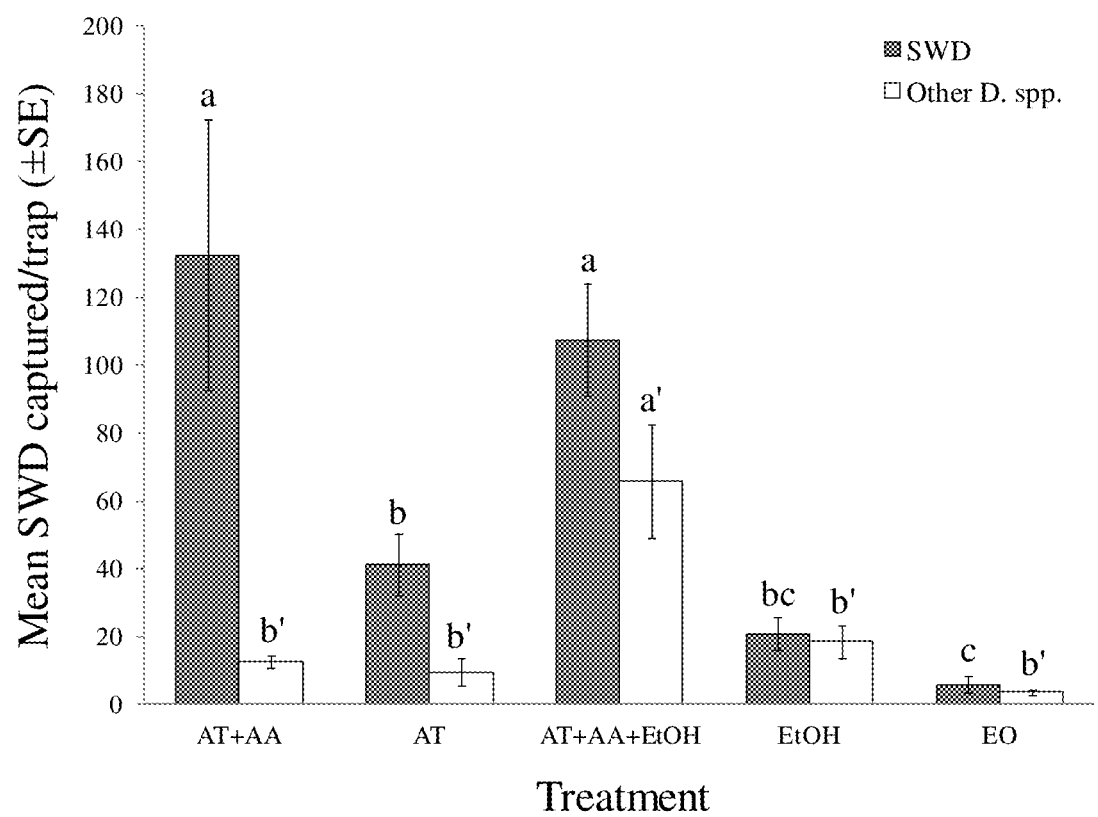
FIG. 4 shows mean catches of *D. suzukii* and other D. spp. in traps baited with different combinations of acetoin (AT), acetic acid (AA), ethyl octanoate (EO), and ethanol (EtOH)

Field tests in 2015: Given that the single-component, ethyl octanoate (EO, treatment 17), was the most attractive component for *D. suzukii* in laboratory bioassays (FIG. 3E and FIG. 3F), it was tested at Beltsville, Agricultural Research Center, MD, in the late fall 2015. Surprisingly, EO alone did not show any activity at all, while the acetoin (AT, treatment 16) was significantly more attractive than EO (F=15.78, p<0.0001) (FIG. 4). In addition, surprisingly the attraction of AT was significantly enhanced when it was combined with acetic acid (AA), but this enhanced effect was not observed for non-target *Drosophila* species (for SWD, F=15.78, p<0.0001; for other D. spp., F=9.71, p<0.0001) (FIG. 4). Furthermore, activity of ethanol (EtOH) was evaluated in the field. The same result as laboratory bioassay was obtained; EtOH alone did not show significant activity; instead, it attracted significantly more non-target *Drosophila* when it was combined with the AT+AA blend (for other D. spp., F=9.71, p<0.0001) (FIG. 4). The synergistic effect of AA to AT was confirmed in a later test. Significantly more *D. suzukii* were surprisingly caught in the trap baited with AT when AA was added to the drowning solution than the traps baited with AT or AA alone (F=12.89, p<0.001) (FIG. 5). Although ethyl octanoate (EO) alone did not show any activity in the field (FIG. 4), surprisingly it significantly enhanced the attraction of AT (AT:EO=1:1), but did not affect the trap catch of other *Drosophila* species (for SWD, F=7.45, p<0.05; for other D. spp., F=1.49, p=0.30) (FIG. 6). No synergistic effect was observed when EO was combined with AA.

Field tests in 2016: Our field data demonstrated that a mixture of ethyl acetate and acetic acid (EA+AA) was moderately attractive to *D. suzukii*, but it was less attractive than a ternary blend (AT+EO+AA). However, when EA was added to this ternary blend to form a quaternary blend (AT+EO+EA+AA), surprisingly attraction to *D. suzukii* was significantly increased, while non-target *Drosophila* attraction was not (for male, F=63.77, p<0.0001; for female, F=16.25, p<0.01; for other D. spp., F=7.06, p<0.05; for total SWD, F=52.24, p<0.001) (FIG. 7). The quaternary blend (AT+EO+EA+AA) was surprisingly also significantly more attractive to *D. suzukii* than the widely-used apple cider vinegar (ACV) and commercially available Scentry® SWD lure under field conditions (for male, F=34.57, p<0.0001; for female, F=39.94, p<0.0001; for other D. spp., F=26.01, p<0.0001; for total SWD, F=37.16, p<0.0001) (FIG. 8). However, like AA and EtOH, EA itself was not attractive in the field (FIG. 8). The population of SWD was unusually high in the middle of November in Beltsville, Md. During a one-week trapping period, surprisingly a total of ~77,600 *D. suzukii* were captured by traps baited with the quaternary blend (AT+EO+EA+AA), yielding an average of 13,000 *D. suzukii* per trap. During the same period, a total of ~28,500 *D. suzukii* were captured by traps baited with ACV, yielding an average of 4,700 *D. suzukii* per trap and a total of ~18,800 *D. suzukii* were captured by traps baited with Scentry® lure, yielding an average of 3,100 *D. suzukii* per trap. In addition, traps baited with the quaternary blend (AT+EO+EA+AA) surprisingly captured much less non-target *Drosophila* than ACV and Scentry® lures, thus demonstrating its higher selectivity for *D. suzukii* attraction (SWD/other D. spp. ratio: quaternary blend=31.95, ACV=15.90, Scentry=10.16) (FIG. 8). The synergistic effect of EA was further confirmed in a subsequent 4-week field test. The newly-formed quaternary blend (AT+EO+EA+AA) surprisingly attracted significantly more *D. suzukii* than the ternary blend (AT+EO+AA), ACV, and Scentry® lures, but did not affect attraction of other *Drosophila* species (for male, F=10.38, p<0.001; for female, F=6.36, p<0.01; for other D. spp., F=1.12, p=0.366; for total SWD, F=8.86, p<0.001) (FIG. 9). Again, the quaternary blend (AT+EO+EA+AA) surprisingly demonstrated the highest SWD/other D. spp. ratio during this period (quaternary blend=11.43, ACV=9.29, Scentry=7.55).

Fermented apple juice also produced significantly more phenethyl alcohol (PE) (compound 20, FIG. 1) compared to fresh apple juice. When tested in the field, PE, like EA, did not show any activity for *D. suzukii* attraction compared to acetoin (AT) (for male, F=9.09, p<0.01; for female, F=11.55, p<0.001; for other D. spp., F=18.61, p<0.0001) (FIG. 10). However, by adding the PE into the quaternary blend (AT+EO+EA+AA) to form a quinary blend (AT+EO+EA+AA+PE), surprisingly it significantly enhanced SWD attraction, but did not affect trap catch of non-target *Drosophila* at the Butler's Orchard blueberry field (for SDW, F=4.47, p<0.05; for other D. spp., F=1.96, p=0.163) (FIG. 11).

Release rates of major attractants: Base on laboratory release rate data, the volatile ingredients, including acetoin (AT), ethyl octanoate (EO), and a blend of AT and EO (ratio=1:1), were desorbed from micro-centrifuge tube dispensers following first order kinetics (FIG. 12: for AT, $r^2$=0.9046; for blend of AT and EO, $r^2$=0.9373; for EO, $r^2$=0.9977). The decreases of volatile ingredients over time were best described by the following equations: for AT: Y=0.6557$e^{-0.316t}$; for blend of AT and EO, Y=0.715$e^{-0.101t}$; and for EO, Y=0.8642$e^{-0.049t}$.

Discussion: Chemical analyses of the headspace volatiles of apple juices using GC-MS revealed twenty identified aromas, of which some were increased in fermented apple juice and others were only produced by the fermentation. By conducting a series of laboratory bioassays and field tests, it was discovered that at least five of them, including acetoin (AT), ethyl octanoate (EO), acetic acid (AA), ethyl acetate (EA), and phenethyl alcohol (PE), were surprisingly responsible for attraction of *D. suzukii*. Acetoin showed moderate activity in laboratory bioassays, but was surprisingly found to be an essential semiochemical for SWD long-range attraction in the field. Acetic acid was inactive by itself in both laboratory bioassays and field tests, but it surprisingly did exhibit a powerful synergistic effect for AT attraction to *D. suzukii* in the field. Ethyl octanoate was a short-range attractant; it revealed the most powerful attracting capacity to *D. suzukii* in laboratory bioassays, but showed no activity by itself under field conditions. However, surprisingly addition of EO into the binary blend of AT and AA to form a ternary blend (AT+EO+AA) significantly enhanced SWD attraction in the field. Ethanol, which has been previously reported as a principal component for SWD attraction from apple cider vinegar, wine, and yeast baits, surprisingly did not enhance the activity of AT and AA. However, surprisingly it did significantly decrease the SWD specificity of the blend (from ~90% to ~30%) by attracting many other non-target insect species into the traps.

The compound, 3-hydroxy-2-butanone also known as acetoin (AT), is one of the volatile components found in increased amounts in fermented apple juice, and exists in fresh apple juice as well as in many other fresh/ripening fruits (Sampaio, T. S., and P. C. L. Nogueira, Food Chem., 95: 606-610 (2006); Pino, J. A., et al., J. Essent. Oil Res., 15: 374-375 (2003); Parada, F., et al., J. Agric. Food Chem., 48: 6200-6204 (2000); Jordan, M. J., et al., J. Agric. Food Chem., 51: 1421-1426 (2003); Jordan, M. J., et al., J. Agric. Food Chem., 50: 5386-5390 (2002); D'Agostino, M. F., et al., Food Chem., 178: 10-17 (2015); Mayorga, H., et al., J. Agric. Food Chem., 49: 1904-1908 (2001)). It exists widely in nature and is mainly used in baked foods as additives to enhance the flavor of the products (Xiao, Z. J., and J. R. Lu, J. Agric. Food Chem., 62: 6487-6497 (2014); Xiao, Z., and J. R. Lu, Biotechnol. Adv., 32: 492-503 (2014); Ensminger, A. H., et al., Foods and nutrition encyclopedia, 2nd edition, Vols. 1 and 2, CRC Press, Inc., 1994; Bratovanova, P., Biotechnology & biotechnological equipment, 15: 124-127 (2001)). It can be found in apples, butter, yogurt, asparagus, blackcurrants, blackberry, wheat, broccoli, brussels sprouts, and cantaloupe as food flavoring and fragrance and is an important physiological metabolite excreted by many microorganisms (Aili, W., et al., Flavour Fragrance J., 27: 47-53 (2012); de Figueroa, R. M., et al., Microbiol. Res., 155: 257-262 (2001); Bratovanova, P., Biotechnology & biotechnological equipment, 11(1-2): 53-59 (1997); Romano, P., et al., Appl. Environ. Microbiol., 59: 1838-1841 (1993); Xiao, Z. J., and P. Xu, Crit. Rev. Microbiol., 33: 127-140 (2007)). Its threshold value in wine is very high, being about 150 mg/liter (Romano, P., and G. Suzzi, Appl. Environ. Microbiol., 62: 309-315 (1996)). The compound acetoin (AT) has also been found as a semiochemical to attract insects (Witzgall, P., et al., J. Chem. Ecol., 36: 80-100 (2010); Tolasch, T., et al., J. Chem. Ecol., 29: 1045-1050 (2003); Vlasakova, B., et al., Ann. Bot., 102 (3): 295-304 (2008); Sreng, L., J. Insect Behav., 6 (6): 715-735 (1993); Sreng, L., J. Chem. Ecol., 16 (10): 2899-2912 (1990); Said, I., et al., J. Chem. Ecol., 31 (8): 1789-1805 (2005)). For SWD, it has been reported that a 4-component synthetic bait (acetic acid (AA), ethanol (EtOH), acetoin (AT), and methionol), in which, the EtOH and AA were core components for activity, was essential for SWD attraction (Cha et al. 2012; Cha et al. 2014; Cha et al. 2015). However, our data revealed that the single compound, AT, was surprisingly the core long-range attractive component in the blends tested in the field for SWD attraction.

The compound EO is also called ethyl caprylate. It has been found in wine and is produced during the fermentation process by yeast (Tsakiris, A., et al., Appl. Biochem. Biotechnol., 162: 1109-1121 (2010); Vianna, E., and S. E. Ebeler, J. Agric. Food Chem., 49: 589-595 (2001); Gallardo-Chacon, J. J., et al., J. Agric. Food Chem., 58: 12426-12430 (2010); Antonelli, A., et al., J. Agric. Food Chem., 47: 1139-1144 (1999); Patel, S., and T. Shibamoto, J. Agric. Food Chem., 50: 5649-5653 (2002)) and widely used in fragrance, flavor, pharmaceutical and cosmetic industries (Hilton, J., et al., Pharmaceutical research, 11: 1396-1400 (1994); Godly, E. W., and A. E. Mortlock, The analyst, 98: 493-501 (1973); Jensen, C. J., and H. Robinson, U.S. Pat. No. 6,589,514 (2003); Opdyke, D. L. J., Monographs on Fragrance Raw Materials: A Collection of Monographs Originally Appearing in Food and Cosmetics Toxicology, pp. 356, Oxford: Pergamon Press Ltd., 1979; Jenner, P. M., et al., Food Cosmet. Toxicol., 2: 323-327 (1964)). In addition, EO is known as one ingredient in multiple-component attractants for several insects including fruit flies in the Tephritidae (El-Sayed, A. M., The pherobase: database of insect pheromones and semiochemicals (2015); Robacker, D. C., et al., J. Chem. Ecol., 18: 1239-1254 (1992); Toledo, J., et al., J. Econ. Entomol., 102: 2072-2077 (2009)). However, to the best our knowledge, EO has not been reported as an attractant component for *D. suzukii*. Interestingly, although EO exhibited the strongest activity for SWD attraction in the laboratory bioassay, it was surprisingly not attractive to *D. suzukii* in field conditions, indicating that EO was a close range attractant. It could significantly synergize the attraction of acetoin (AT) in the field.

Attractive activity of the ternary blend (AT+EO+AA) to *D. suzukii* was surprisingly also significantly increased by adding ethyl acetate (EA) to form a quaternary blend (AT+EO+AA+EA). Surprisingly it was 2-4 times more attractive and 2-3 times more selective than the widely-used ACV and commercially available SWD lures under field conditions, indicating that the EA is also a significant synergist for SWD attraction. Moreover, phenethyl alcohol (PE), a volatile enriched during fermentation, surprisingly also functioned as a strong synergistic agent. Our data indicated that a quinary chemical blend (AT+EO+AA+EA+PE) was surprisingly more attractive than the quaternary blend (AT+EO+AA+EA) in field conditions and that neither ethyl acetate (EA) nor phenethyl alcohol (PE) was attractive to *D. suzukii* in the field.

Ethyl acetate (EA) is a major volatile component in plants (Malkina, I. L., et al., J. Environ. Qual., 40 (1): 28-36 (2011); Nonato, E. A., et al., J. Agric. Food Chem., 49 (8): 3533-3539 (2001)) including many fruits (Krokida, M. K., and C. Philippopoulos, J. Food Eng., 73 (2): 135-141 (2006); Nojima, S., et al., J. Chem. Ecol., 29 (10): 2347-2357 (2003)), as well as in wine (Plata, C., et al., Food Microbiol., 20 (2): 217-224 (2003); Romano, P., et al., Int. J. Food Microbiol., 86 (1-2): 169-180 (2003); Ciani, M., et al., Int.

J. Food Microbiol., 108 (2): 239-245 (2006): Viana, F., et al., Food Microbiol., 25 (6): 778-785 (2008)), beer (Jelen, H. H., et al., J. Agric. Food Chem., 46 (4): 1469-1473 (1998)), whiskey (Carter, R. V., and B. Linsky, Atmos. Environ., 8 (1): 526-526 (1974)), microbes (Lobs, A. K., et al., Biotechnol. J., 11 (10): 1274-1281 (2016)), and animal waste (Yasuhara, A., J. Chromatogr., 387: 371-378 (1987)). It is an ester of ethanol and acetic acid and has been widely used as flavor enhancer in food and beverage production and as aroma enhancer in cosmetics and perfumes. It is affirmed by the United States Food and Drug Administration as GRAS (generally recognized as safe) (Opdyke, D. L. J., Monographs on Fragrance Raw Materials: A Collection of Monographs Originally Appearing in Food and Cosmetics Toxicology in Monographs on Fragrance Raw Materials, edited by D. L. J. Opdyke (Pergamon Press, 2013), pp. 804) and widely accepted as a safe food additive in many countries with E number E1504. In addition, EA is also widely used as a solvent for extracting organic compounds. Moreover, EA has also been reported as a component of pheromones or attractants for a variety of insects (El-Sayed, A. M., The pherobase: database of insect pheromones and semiochemicals, Available at http://www.pherobase.com, (2017)). For *D. suzukii*, our data clearly demonstrate that surprisingly EA can significantly synergize the attraction of the ternary blend in the field. This is surprisingly in contrast to previous findings that EA acts as a repellent that reduces the attraction of *D. suzukii* to blends of ethanol and acetic acid both in lab and field conditions (Cha, D., et al., J. Chem. Ecol., 38 (11): 1419-1431 (2012)).

The compound phenethyl alcohol (PE) occurs widely in nature. It is the main volatile component of rose aromas (Kim, J. H., et al., Ann. Dermatol., 22 (3): 255-261) and can also be found in many other essential oils, e.g. carnation, hyacinth, Aleppo pine, orange blossom, ylang-ylang, geranium, neroli, and champaca (Li, C., et al., Food Chem., 154: 205-210). Because of its mild rose odor, PE has been extensively used in cosmetics, flavors, and perfumes (Scognamiglio, J., et al., Food Chem. Toxicol., 50: S244-239 (2012)). Interestingly, it also is an autoantibiotic produced by the fungus *Candida albicans* (Lingappa, B. T., et al., Science, 163 (3863): 192-194 (1969)). As a common semiochemical, PE has been used by more than 90 different insect/arthropod species in their chemical communication (El-Sayed, A. M., The pherobase: database of insect pheromones and semiochemicals, Available at http://www.pherobase.com, (2017)), notably as a strong repellent against ticks (Thorsell, W., et al., Phytomedicine, 13 (1-2): 132-134 (2006)). For *D. suzukii*, PE is one of the attractive components in the baits used by growers in the Pacific Coast states (Walsh, D. B. et al., J. Integr. Pest Manage., 2 (1): G1-G7 (2011)). To the best our knowledge, PE has not been reported as a single-component to have any synergistic interactions with other components in *D. suzukii* attraction.

Most of the SWD baits published prior to our experiments were based on two major fermentation products, ethanol (EtOH) and acetic acid (AA), and activity of these principal compounds could be synergized by several other chemicals (Landolt, P. J., et al., J. Appl. Entomol., 136 (1-2): 148-154 (2012); Landolt, P. J., et al., Fla. Entomol., 95 (2): 326-332 (2012); Kleiber, J. R. et al., Environ. Entomol., 43 (2): 439-447 (2014); Cha, D., et al. 2012; Cha, D. H. et al., Pest Manage. Sci., 70 (2): 324-331 (2014); Cha, D. H. et al., Entomol. Exp. Appl., 154 (3): 251-260 (2015)). However, surprisingly neither of these two compounds alone or in combination showed significant activities in our studies, which, without being bound by theory, may be due to the different formulations and trap designs we used compared to those from previously-published works. Instead, AA surprisingly exhibited significantly synergistic effect to the SWD attraction of AT, and EtOH had the surprising undesirable effect of reducing lure selectivity.

Our laboratory release rate study demonstrated that the long-range attractant acetoin (AT), short-range attractant ethyl octanoate (EO), and a blend of AT and EO desorbed from micro-centrifuge tube dispensers followed first order kinetics (for AT: k=0.316; for EO, k=0.049; for blend of AT and EO: k=0.101). Half-life time of dispensers can be calculated by the equation: $t_{1/2}$=0.693/k. Thus, micro-centrifuge tube dispensers with 1 mL loadings will release 50% of AT in ~2-d, EO in ~14-d, and AT and EO blend (ratio=1:1) in ~7-d. The data surprisingly indicated that EO not only functioned as a short-range SWD attractant, but also could slow down the release rate of AT when blended together, thereby prolonging lure longevity. Considering that the average temperature in the field may be higher than in our laboratory, the actual rate constant (k) could be greater than that obtained in the laboratory. Therefore, the effective half-life for our baits may be shorter in the field than the calculated value. Dispensers baited with 1 mL AT and EO blend (ratio=1:1) as the essential SWD attractant in a quaternary blend (AT+EO+AA+EA) or a quinary blend (AT+EO+AA+EA+PE) could not be expected to provide more than one week of maximum SWD attraction under field conditions.

Our identified SWD attractant blend will have significant impact on the management of this invasive species. Classical biological control programs for *D. suzukii* appear promising based on outcomes of similar programs for other invasive fruit flies (e.g., Mediterranean fruit fly and melon fly); however, placement and timing are critical for accurate release and subsequent control. As a demonstrated essential volatile component for SWD attraction, acetoin could be one of the major chemical cues used to attract *D. suzukii* to bait or monitoring stations. The newly-identified quinary chemical blend (AT+EO+EA+AA, PE) is expected to more efficiently and selectively attract SWD at lower population levels for detection and before extensive fruit injury can occur. In addition, elimination of EtOH as an effective bait component will allow traps to be employed without harming pollinators or other beneficial insects. The increased attractiveness and specificity of the quinary chemical blend will help accurately delineate SWD infestations for timely pest management interventions, thereby reducing the need for conventional insecticide usage and ultimately protecting our environment and ecosystem.

All of the references cited herein, including U.S. Patents, are incorporated by reference in their entirety.

Thus, in view of the above, there is described (in part) the following:

A method of attracting *Drosophila suzukii*, said method comprising (or consisting essentially of or consisting of) treating an object or area with a *Drosophila suzukii* attracting effective amount of a composition comprising (or consisting essentially of or consisting of) acetoin and at least one compound selected from the group consisting of ethyl octanoate, acetic acid, ethyl acetate, phenethyl alcohol, and mixtures thereof; wherein said composition does not contain ethanol.

The above method, wherein said composition does not contain methionol.

The above method, wherein said composition contains acetic acid (AA).

The above method, wherein said composition contains ethyl octanoate (EO).

The above method, wherein said composition contains ethyl acetate.

The above method, wherein said composition contains phenethyl alcohol.

The above method, wherein said composition contains at least two compounds selected from the group consisting of ethyl octanoate, acetic acid, ethyl acetate, phenethyl alcohol, and mixtures thereof.

The above method, wherein said composition contains at least three compounds selected from the group consisting of ethyl octanoate, acetic acid, ethyl acetate, phenethyl alcohol, and mixtures thereof.

The above method, wherein said composition contains ethyl octanoate, acetic acid, ethyl acetate, and phenethyl alcohol.

The above method, wherein the insects attracted by said composition are at least about 90% (e.g., at least 90%) Drosophila suzukii. The above method, wherein the insects attracted by said composition are about 95% (e.g., 95%) Drosophila suzukii.

The above method, wherein said composition contains acetic acid. The above method, wherein said composition does not contain acetic acid. The above method, wherein said composition contains acetoin. The above method, wherein said composition does not contain acetoin. The above method, wherein said composition contains benzaldehyde. The above method, wherein said composition does not contain benzaldehyde. The above method, wherein said composition contains butanol. The above method, wherein said composition does not contain butanol. The above method, wherein said composition contains butyl acetate. The above method, wherein said composition does not contain butyl acetate. The above method, wherein said composition contains dimethyl sulfoxide. The above method, wherein said composition does not contain dimethyl sulfoxide. The above method, wherein said composition contains ethyl acetate. The above method, wherein said composition does not contain ethyl acetate. The above method, wherein said composition contains ethyl decanoate. The above method, wherein said composition does not contain ethyl decanoate. The above method, wherein said composition contains ethyl hexanoate. The above method, wherein said composition does not contain ethyl hexanoate. The above method, wherein said composition contains ethyl octanoate. The above method, wherein said composition does not contain ethyl octanoate. The above method, wherein said composition contains hexanal. The above method, wherein said composition does not contain hexanal. The above method, wherein said composition contains 1-hexanol. The above method, wherein said composition does not contain 1-hexanol. The above method, wherein said composition contains hexyl acetate. The above method, wherein said composition does not contain hexyl acetate. The above method, wherein said composition contains isobutanol. The above method, wherein said composition does not contain isobutanol. The above method, wherein said composition contains methyl benzoate. The above method, wherein said composition does not contain methyl benzoate. The above method, wherein said composition contains 2-methybutyl acetate. The above method, wherein said composition does not contain 2-methybutyl acetate. The above method, wherein said composition contains 2-methylbutanol. The above method, wherein said composition does not contain 2-methylbutanol. The above method, wherein said composition contains 3-methylbutanol. The above method, wherein said composition does not contain 3-methylbutanol. The above method, wherein said composition contains trans-2-hexenal. The above method, wherein said composition does not contain trans-2-hexenal. The above method, wherein said composition contains trans-2-hexenol. The above method, wherein said composition does not contain trans-2-hexenol. The above method, wherein said composition contains phenethyl alcohol. The above method, wherein said composition does not contain phenethyl alcohol.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element (e.g., method (or process) steps or composition components) which is not specifically disclosed herein.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Captured D. suzukii in traps baited with different treatments in a preliminary field test conducted during Oct. 17 to Oct. 24, 2014

| Treatment | Replicates | Total no. SWD captured | Mean ± SD |
| --- | --- | --- | --- |
| Apple juice blend (7-components)* | 3 | 845 | 281.67 ± 35.47a |
| Raspberry blend (11-components)** | 3 | 230 | 76.67 ± 25.17b |
| 2MB | 3 | 3 | 1.00 ± 1.00c |
| 3MB | 3 | 9 | 3.00 ± 1.00c |
| 2MB + 3MB | 3 | 4 | 1.33 ± 0.58c |
| Blank control | 3 | 1 | 0.33 ± 0.58c |

Means in the same column followed by the different letters are significantly different at $\alpha = 0.05$ (one-way ANOVA, Ryan-Einot-Gabriel-Welsch F test, $F = 120.00$; $df = 5, 12$, $p < 0.001$).
*Seven components blend includes isobutanol, 2-methyl butanol (2MB), 3-methyl butanol (3MB), ethyl hexanoate, acetoin, ethyl octanoate, and methyl benzoate.
**Components were listed in experimental section.

TABLE 2

Captured D. suzukii in tubes baited with different treatments in laboratory bioassays

| Treatment | Replicates | Total no. tested | Total no. captured | Mean ± SD |
| --- | --- | --- | --- | --- |
| 1 (7 components)* | 5 | 50 | 23 | 4.60 ± 2.19c |
| 11 (2MB + AT + EO) | 5 | 50 | 26 | 5.20 ± 2.28bc |
| 14 (AT + EO) | 5 | 50 | 47 | 9.40 ± 0.55a |
| 17 (EO) | 5 | 50 | 49 | 9.80 ± 0.45a |
| Raspberry extract | 5 | 50 | 38 | 7.60 ± 1.81ab |

Means in the same column followed by the different letters are significantly different at $\alpha = 0.05$ (one-way ANOVA, Ryan-Einot-Gabriel-Welsch F test, $F = 10.167$; $df = 4, 20$, $p < 0.001$).
*Seven components blend includes isobutanol, 2-methyl butanol (2MB), 3-methyl butanol (3MB), ethyl hexanoate, acetoin (AT), ethyl octanoate (EO), and methyl benzoate.

We claim:

1. A composition for selectively attracting Drosophila suzukii, said composition comprising:
   (a) an effective selectively Drosophila suzukii attracting amount of at least acetoin, and ethyl octanoate, wherein said composition does not contain ethanol and 2-methyl-1-butanol; and
(b) optionally a carrier.

2. The composition of claim 1 wherein said composition further comprises acetic acid.

3. The composition of claim 1 wherein said composition further comprises ethyl acetate.

4. The composition of claim 3 wherein said composition further comprises phenethyl alcohol.

5. An insect trap comprising the attracting composition of claim 1.

6. An insect trap comprising the attracting composition of claim 2.

7. An insect trap comprising the attracting composition of claim 3.

8. An insect trap comprising the attracting composition of claim 4.

9. A method of attracting *Drosophila suzukii*, said method comprising treating an object or area with a *Drosophila suzukii* attracting effective amount of a composition comprising acetoin and ethyl octanoate, and at least one compound selected from the group consisting of acetic acid, ethyl acetate, phenethyl alcohol, and mixtures thereof; wherein said composition does not contain ethanol.

10. The method according to claim 9, wherein said composition does not contain 2-methyl-1-butanol.

11. A method of attracting *Drosophila suzukii*, said method comprising treating an object or area with a *Drosophila suzukii* attracting effective amount of a composition comprising acetoin and ethyl octanoate, and at least one compound selected from the group consisting of acetic acid, ethyl acetate, phenethyl alcohol, and mixtures thereof; wherein said composition does not contain 2-methyl-1-butanol.

12. The method according to claim 11, wherein said composition does not contain ethanol.

13. A composition for attracting *Drosophila suzukii*, said composition comprising:
(a) an effective attracting amount of at least acetoin, and ethyl octanoate, wherein said composition does not contain 2-methyl-1-butanol; and
(b) optionally a carrier.

14. A composition for selectively attracting *Drosophila suzukii*, said composition comprising:
(a) an effective selectively *Drosophila suzukii* attracting amount of at least acetoin, and ethyl octanoate, wherein said composition does not contain ethanol; and
(b) optionally a carrier.

15. The composition according to claim 1, said composition further comprising an insecticide for *Drosophila suzukii*.

* * * * *